Feb. 23, 1937.  R. L. LÉVY  2,071,884
RETRACTABLE LANDING GEAR FOR AEROPLANES
Filed Aug. 8, 1934  3 Sheets-Sheet 1

Inventor
R. L. Lévy,
By Glascock Downing v Seebold
Attys.

Feb. 23, 1937.  R. L. LEVY  2,071,884
RETRACTABLE LANDING GEAR FOR AEROPLANES
Filed Aug. 8, 1934  3 Sheets-Sheet 3

Inventor
R. L. Levy,

Patented Feb. 23, 1937

2,071,884

UNITED STATES PATENT OFFICE 2,071,884

RETRACTABLE LANDING GEAR FOR AEROPLANES

René Lucien Lévy, Montrouge, France, assignor to Societe d'Inventions Aeronautiques et Mecaniques S. I. A. M., Fribourg, Switzerland Application August 8, 1934, Serial No. 739,044
In France May 24, 1934

1 Claim. (Cl. 244—102)

In many retractable landing gears for aeroplanes, each wheel is carried by a fork which can be retracted towards the front or towards the rear of the machine. When raising is effected towards the rear, the fork is held in the lowered position by a system of trusses which connects it to the rear spar of the aeroplane. The raising operation has for preliminary condition the elimination of the action of these trusses and, for that purpose, two main methods have up to now been suggested, viz: the sliding or folding of the trusses.

The sliding of the trusses, in the actually known conceptions of this method, has the inconvenience of necessitating the use of a locking device which has to support very important stresses. The practical construction of landing gears thus equipped involves difficulties in the manufacture.

The truss-folding method has up to now been carried out by means of props, each constituted by two foldable elements, capable of propping against each other when the landing gear is in its lowered position. In this case, for annulling the propping action, when it is desired to raise the landing gear, it is necessary to use a control which, usually, is very complicated.

The present invention relates to this second type of retractable landing gears for aeroplanes, and it substantially consists in transferring the stresses (which, in the lowered position of the landing gear, are exerted at the pivot point of the two elements constituting the foldable prop) on to a locking member, the position and setting of which are such that this locking member supports only small stresses, when the prop is extended, for rolling on the ground.

The position of the "breaking" point of this prop is thus rigorously fixed in the space, without having to provide a locking device having to support considerable stresses, as is the case in actually known constructions. It is moreover to be understood that the invention is applicable to foldable props, the elements of which are propped or not against each other.

In a form of construction which will be more particularly described hereinafter, but by way of example only, the "breaking" point of the prop is connected to the locking member by means of an auxiliary attaching arm which is rigid with one of the foldable elements and constitutes, with this element, a lever rocking about the fixed pivot point of the said element. The reduction of the stresses transmitted to the locking member by the attaching end of this auxiliary arm results from two factors: on the one hand, the suitable choice of the relative lengths of the arms of the lever, on the other hand, the inclination which may be given to the line of action of the locking member in order that, according to this line, the component of the stresses transmitted to the end of the attaching arm should be as small as possible.

In another form of construction, also given by way of example, the driving system used for raising and, eventually, lowering the landing gear, directly controls one of the elements of the foldable prop, in this case the element rigid with the rocking lever through which the locking action is effected.

In the accompanying drawings:

Fig. 1 diagrammatically illustrates a wheel of a landing gear with an improved foldable prop according to the invention.

Figure 1:
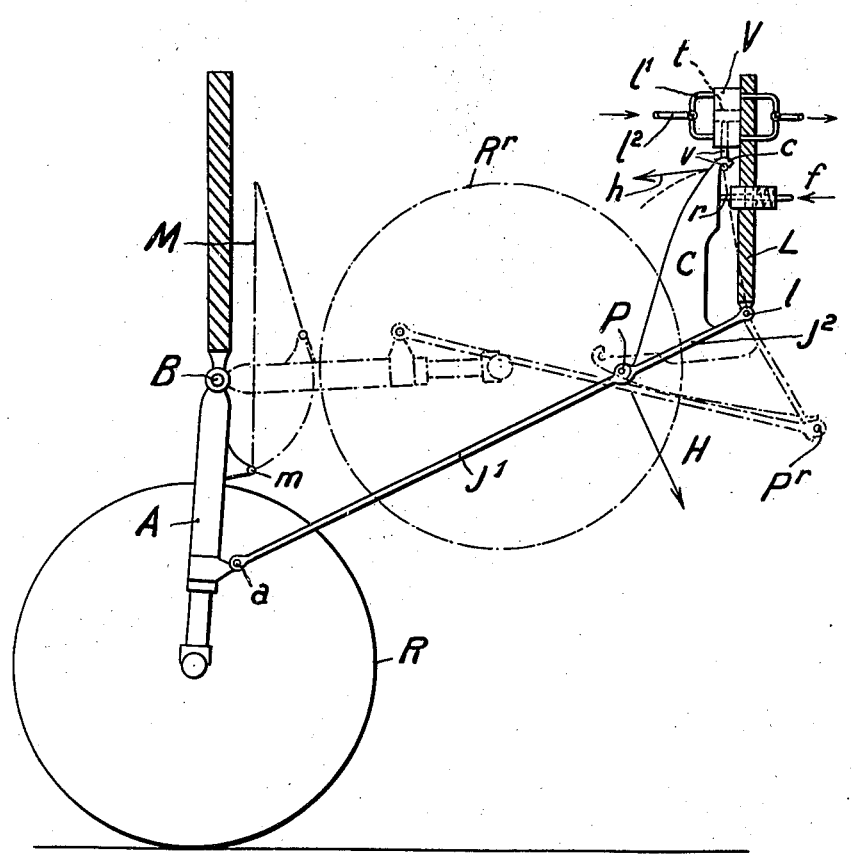

Referring to Fig. 1 of the drawings, it will be seen that the wheel R (the axle of which is supported by a shock absorber A capable of rocking, for the raising operation, about a pivot pin B) is connected to the rear spar L by means of a foldable prop, the elements $J^1$—$J^2$ of which are joined, by propping or not against each other, at a "breaking" point P.

The other ends of the elements $J^1$—$J^2$ are respectively pivoted at $a$ and at $l$, the latter constituting a fixed point rigid, for instance, with the rear spar L.

On one of the elements (in the example, the element $J^2$) of the prop, is secured an auxiliary arm C, the end $c$ of which, upon extension of the prop, comes an engagement with the movable element $v$ of a locking member V. The latter, in the example, shown, operates hydraulically, being constituted, for that purpose, by a cylinder in which moves a piston $t$, and a fluid under pressure can be directed, by means of a pipe line $l^1$—$l^2$, on either face of the piston.

In extended position of the prop (position shown in full lines in the figure), the ratio of the stresses $h$ and $H$, which are respectively exerted at points $c$ and $P$, is reverse to the ratio of the distances separating these points from the fixed pivot point $l$, so that, by a suitable choice of these distances it is possible to transfer to the attaching point $c$ a reduced stress only. On the other hand, by suitably setting the locking member V, the component of the stress $Hh$, according to the line of action of the locking member, can again be very reduced. In these conditions, if the locking member is secured sufficiently firmly for enabling it to support the normal component of the stress $h$, the stresses this locking member will have to support during the operation for releasing or locking the landing gear will be very small.

In order that the prop $J^1$—$J^2$ should surely open immediately upon unlocking, to the arm C can be added a spring push-piece $r$, which, acting in the direction $f$, pushes back the unlocked arm C, that is to say causes the prop to open at point P.

At the end of the raising operation, the wheel occupies the position $R^r$ and the prop is folded, in the position indicated in dot and dash lines in the figure, the "breaking" or folding point being then at $P^r$.

In this position, the wheel can be held by any suitable means for instance by the raising device itself.

Figure 2:
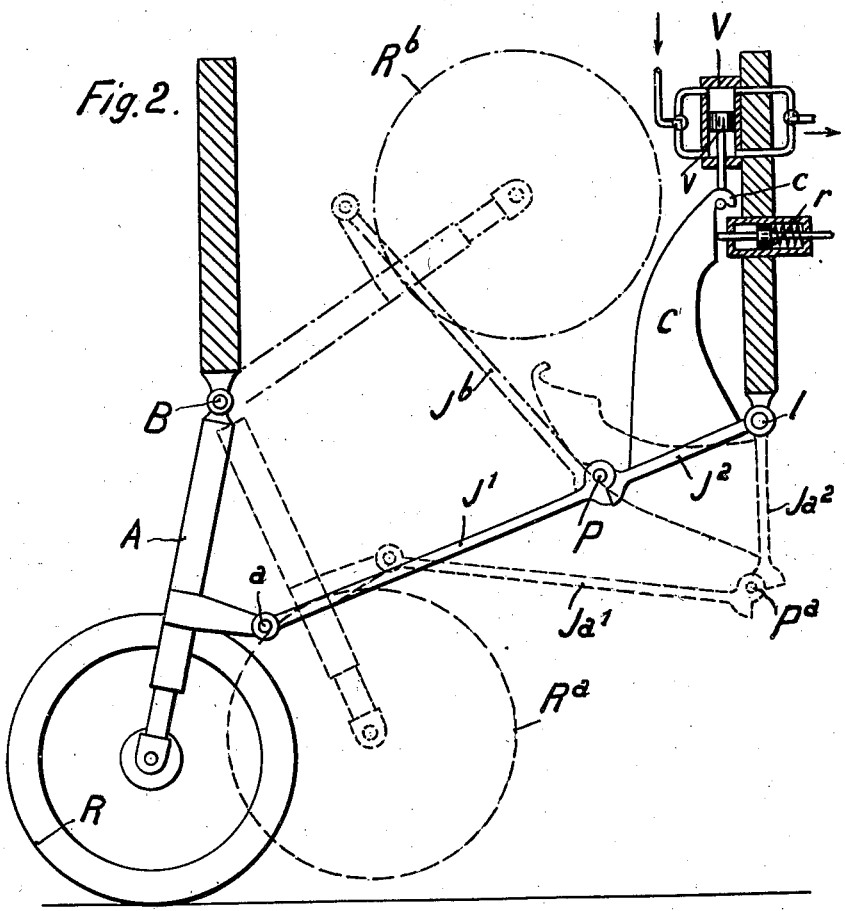
Fig. 2 shows a modification utilizing the same principle, but in which, in addition, a single locking member can be used for locking the prop as well in the extended position (wheel in lowered position), as in the folded position (wheel in raised position).

The modification shown in Fig. 2 utilizes the same locking principle with reduced stress. However, the folding of the prop $J^1$—$J^2$ is effected in two stages.

In a first stage, the folding point P comes at $P^a$; the wheel at $R^a$, the prop at $Ja^1$—$Ja^2$. During a second stage, $P^a$ moves backwards until it returns to P, $Ja^2$ returning at $J^2$ to its starting position, whilst the arm $Ja^2$ comes at $J^b$ and the wheel at $R^b$, final position of the raising movement.

Figure 3:
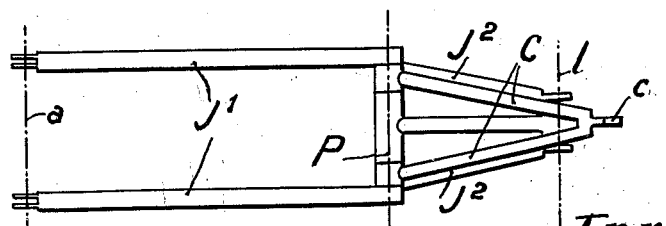
Fig. 3 is a plan view showing a foldable truss made in the shape of a fork.

Owing to the fact that the starting position and the final position of the element $J^2$ coincide, the arm C, at the end of the raising operation, presents its attaching end $c$ to the locking member, so that the latter also fulfills its function for locking the landing gear in the raised position. This result is obtained by suitably choosing the ratio of the elements $J^1$—$J^2$ as well as the relative location of the points of oscillation B and $l$. The truss can be made in the shape of a fork, as illustrated, by way of example, in Fig. 3.

It is to be understood that the invention is independent of the driving system used for effecting the raising operation.

By way of indication, a raising cable M, attached to the landing gear at $m$, has simply been illustrated in Fig. 1.

Figure 4:
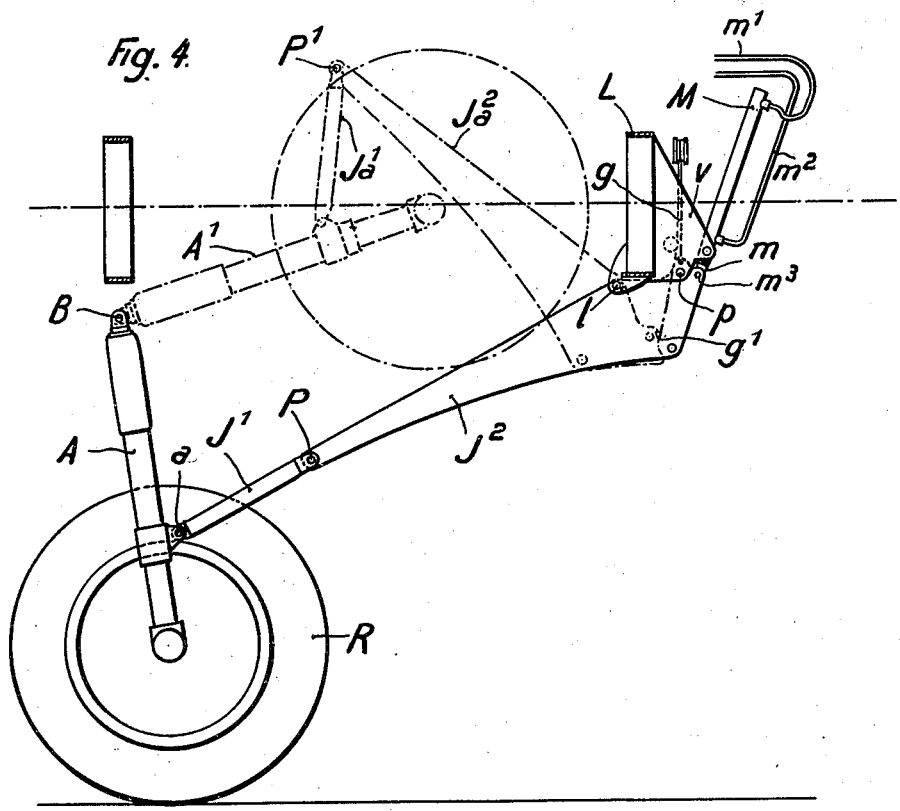
Fig. 4 is a side elevation of another form of construction of a retractable landing gear.

In the form of construction illustrated in Fig. 4, the element $J^2$ of the prop constitutes both the rocking lever used for locking purposes and the member receiving the driving stress for the actuation of the landing gear in order to raise or lower it.

For that purpose, as illustrated by way of example in the accompanying drawings, on this element $J^2$ is pivoted, at $m^3$, the rod $m$ of the piston, or equivalent member, of a hydraulic jack M, which is assumed to be of the double acting type and is fed by the pipe lines $m^1$—$m^2$.

In these conditions, according as liquid under pressure is sent in one or the other of these pipe lines, the lever $J^2$, rocking about the pivot pin $l$, is pulled or pushed back, this corresponding, respectively, to the lowering of the wheel R (extended prop), or to the raising of this wheel (folded prop), the folding of the prop taking place, as previously, about the pivot pin P, whilst the wheel and its shock absorber pivot about the pivot pin B.

In Fig. 4, the raising position is indicated in dot and dash lines, and the letter $a$ is added to the reference of the various elements of the landing gear.

According to the feature of the forms of construction previously described, the locking of the prop in the extended position is effected at a suitably chosen point of the rocking lever $J^2$.

Figure 5:
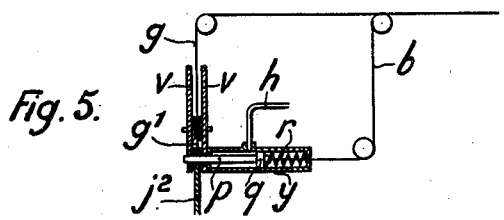
Fig. 5 illustrates, by way of example, a locking device with compound control.

In the example illustrated in Fig. 5, a hydraulic control is used for setting the locking member (unlocking position). The nose $j^2$, belonging to the rocking lever $J^2$, and on which the locking action is to be effected, moves, for locking, between two fixed cheek members $v$—$v$, rigid, for instance, with the spar L. The locking member is constituted by the rod $p$ of a piston $q$ movable in a cylinder $y$ and constantly subjected to the action of a spring $r$. A pipe line $h$ alternately allows to send liquid under pressure in the cylinder, on the face of the piston opposed to the spring $r$, or to evacuate this liquid, by means which can be operated by the pilot.

For lowering the landing gear, the pilot sends liquid under pressure in front of the piston, so that the latter moves in within the cylinder by compressing the spring $r$; its rod $p$ comes out of the hole locking the nose $j^2$ and allows the latter to move from between the cheek members $v$ under the driving action of the hydraulic jack M.

Reversely, for effecting the locking operation, the pilot connects the pipe line $h$ to the exhaust, at the moment the hole locking the nose $j^2$ comes opposite the said piston rod $p$, so that the latter, pushed back by the spring $r$, locks the element $j^2$ in the lowered position of the landing gear.

The present invention also comprises emergency means ensuring the unlocking and lowering operation of the landing gear, which means can be used instead of the hydraulic control.

For that purpose, for lowering the landing gear, a cable $g$, under the control of the pilot, is attached to a point $g^1$ of the rocking lever $J^2$ and can, by a pull, restore the prop to the extended position.

In the same case, for the preliminary unlocking operation, an auxiliary cable $b$, attached to the piston $q$ of the locking member, allows to retract the latter.

It is moreover to be noted that, owing to the use of a hydraulic double acting jack, capable of ensuring a hydraulic locking and owing to the reduction of the stresses which is due to the fact that both elements of the prop are placed in alignment, the function of the locking member becomes less essential than when the raising is simply effected by a system of cables.

Figure 6:
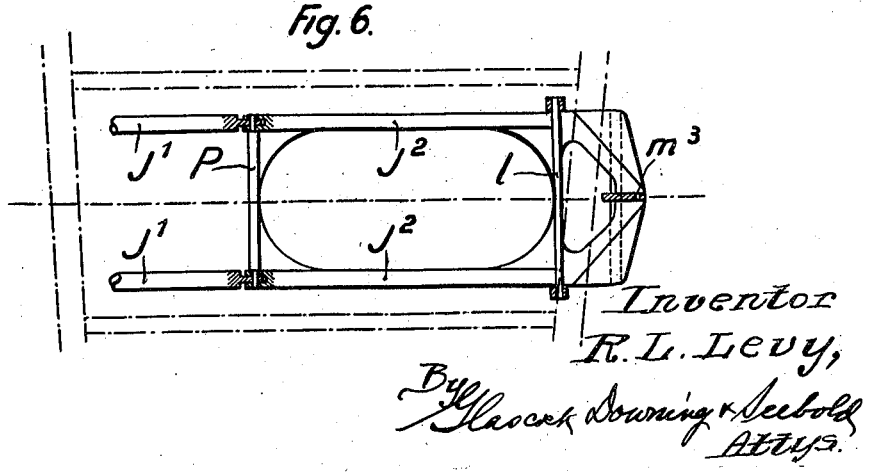
Fig. 6 is a plan view showing a constructional detail of the foldable prop.

Fig. 6 illustrates, by way of indication, a form of construction of the foldable prop, in which the element $J^1$ constitutes a fork which is pivoted, by means of the pivot pin P, on a frame formed by the levers $J^2$ rocking together about the pivot pin $l$ carried by the rear spar.

The system of foldable prop which has just been described can also cooperate, in particular, with the raising systems which have formed the subject-matter of the French patent application dated 27th March 1934 and of the patent of addition thereto of the 9th May 1934, filed in the name of Mr. René Lucien Lévy, for "System of retractable landing gear for aeroplanes."

What I claim as my invention and desire to secure by Letters Patent is:

A retractable landing gear for aeroplanes, comprising at least one prop constituted by two elements moved to extended position and which can be folded for the raising operation, a driving system used for raising, and eventually, lowering the gear, an auxiliary attaching arm rigid, on each prop, with one of the foldable elements, an attaching point on this auxiliary arm, a locking member coming opposite this attaching point when the prop is in extended position, a position of the attaching point on the auxiliary arm and a position of the locking member such that the component of the stresses, according to the line of action of the locking member, is as small as possible, a spring push-piece acting on the auxiliary arm for causing the prop to open at the moment the said arm is unlocked.

RENÉ LUCIEN LÉVY.